US012098885B2

(12) United States Patent
Kleinpass et al.

(10) Patent No.: US 12,098,885 B2
(45) Date of Patent: Sep. 24, 2024

(54) SHIELDING FOR A HIGH-TEMPERATURE FURNACE

(71) Applicant: PLANSEE SE, Reutte (AT)

(72) Inventors: Bernd Kleinpass, Reutte (AT); Peter Mallaun, Reutte (AT); Christoph Lentsch, Reutte (AT); Markus Klocker, Reutte (AT)

(73) Assignee: Plansee SE, Reutte (AT)

( * ) Notice: Subject to any disclaimer, the term of this patent is extended or adjusted under 35 U.S.C. 154(b) by 759 days.

(21) Appl. No.: 17/312,493

(22) PCT Filed: Nov. 28, 2019

(86) PCT No.: PCT/EP2019/082852

§ 371 (c)(1),
(2) Date: Jun. 10, 2021

(87) PCT Pub. No.: WO2020/120147

PCT Pub. Date: Jun. 18, 2020

(65) Prior Publication Data

US 2022/0128305 A1 Apr. 28, 2022

(30) Foreign Application Priority Data

Dec. 10, 2018 (AT) .................................. A 200/2018

(51) Int. Cl.
*F27D 1/00* (2006.01)
*F27B 5/08* (2006.01)
*F27D 1/14* (2006.01)

(52) U.S. Cl.
CPC .............. *F27D 1/0033* (2013.01); *F27B 5/08* (2013.01); *F27D 1/145* (2013.01)

(58) Field of Classification Search
CPC ........... F27D 1/0033; F27D 1/145; F27B 5/08
See application file for complete search history.

(56) References Cited

U.S. PATENT DOCUMENTS

| | | | | | |
|---|---|---|---|---|---|
| 3,033,547 | A | | 5/1962 | Baker et al. | |
| 3,170,018 | A | | 2/1965 | Kewus | |
| 3,185,460 | A | | 5/1965 | Mescher et al. | |
| 3,456,935 | A | | 7/1969 | Bornor | |
| 3,558,113 | A | | 1/1971 | Strohmeier et al. | |
| 3,609,295 | A | | 9/1971 | Bielefeldt | |
| 4,221,922 | A | | 9/1980 | Okimune | |
| 4,422,848 | A | * | 12/1983 | Musil ........................ | F27B 7/20 432/118 |
| 4,910,063 | A | * | 3/1990 | Holland .................... | F27D 1/04 428/920 |

FOREIGN PATENT DOCUMENTS

| | | | |
|---|---|---|---|
| CN | 101968313 | A | 2/2011 |
| CN | 102337511 | A | 2/2012 |
| CN | 104139281 | A | 11/2014 |
| CN | 207513756 | U | 6/2018 |
| DE | 1758992 | A1 | 3/1971 |
| DE | 2117398 | A1 | 1/1972 |
| DE | 2850595 | A1 | 8/1979 |

* cited by examiner

*Primary Examiner* — David J Laux
(74) *Attorney, Agent, or Firm* — Laurence A. Greenberg; Werner H. Stemer; Ralph E. Locher

(57) ABSTRACT

A shielding module for a high-temperature furnace has a packet of interconnected shielding plates. The packet of interconnected shielding plates is mounted to a common base body. The base body has fixing points for fixing to base bodies of other shielding modules of the same kind.

15 Claims, 10 Drawing Sheets

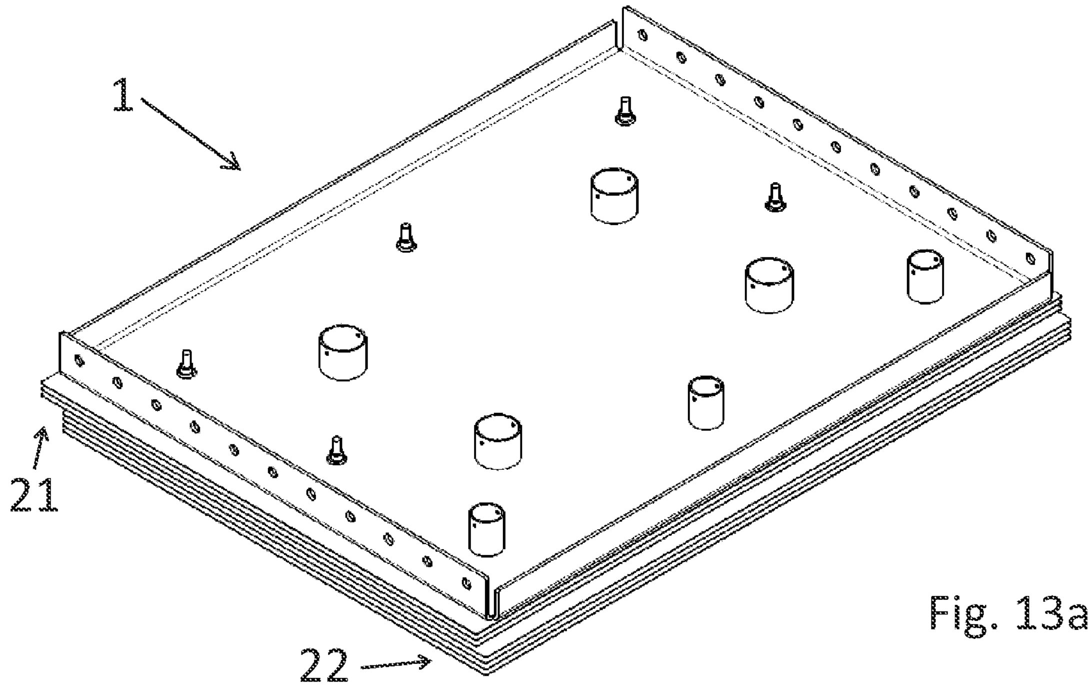
Fig. 13a
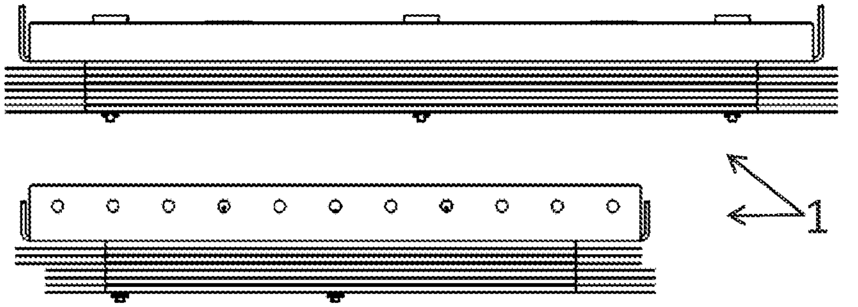
Fig. 13b
Fig. 13c
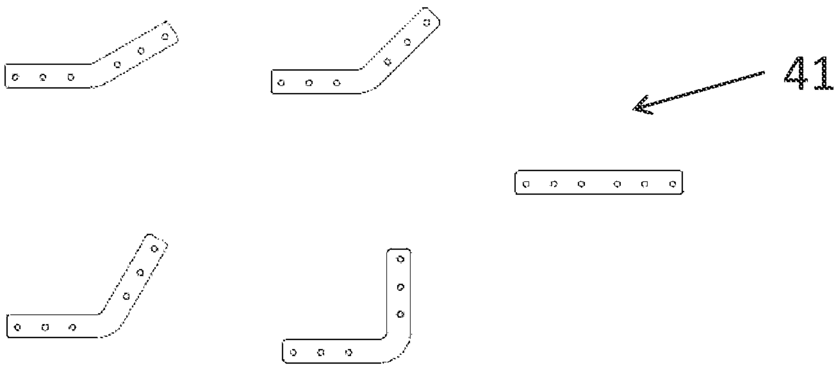
Fig. 13d

SHIELDING FOR A HIGH-TEMPERATURE FURNACE

BACKGROUND OF THE INVENTION

Field of the Invention

The invention concerns a shielding module for a high-temperature furnace which has a packet of interconnected shielding plates.

In the context of the present application, a shielding module means an assembly of several shielding plates arranged parallel to and spaced apart from one another. By multiple reflection on the shielding plates, this assembly achieves a shield against radiant heat and thus acts as insulation.

This form of full metallic insulation is used in particular for high-temperature furnaces with high requirements for purity of a process atmosphere or for vacuum furnaces.

The term "high-temperature" generally refers to furnaces with a process temperature above around 800° C.

A high-temperature furnace comprises a usually water-cooled furnace shell which forms a furnace chamber. Shielding modules are arranged inside the furnace chamber and surround a process chamber. The process chamber forms the space which is provided for heat treatment. The shielding modules insulate the process chamber against the furnace shell.

An arrangement of shielding modules is known as a shield. An assembly of a shield together with heat conductors is known as a hot zone. The hot zone of a high-temperature furnace is decisive for the temperature distribution, purity and energy consumption of high-temperature processes.

A generic shielding module is known from DE1758992 (A1). The shielding modules, designated therein as "shielding packs" and arranged in a multiplicity, form a shield of the furnace. The individual shielding modules are attached to a supporting frame, known as a cylinder housing, by means of flanges.

SUMMARY OF THE INVENTION

It is an object of the invention to provide an improved shielding module and an improved shield formed from a plurality of shielding modules.

This object is achieved by a shielding module as claimed. Advantageous embodiments of the invention are defined in the dependent claims.

The shielding module according to the invention for a high-temperature furnace comprises a packet of interconnected shielding plates. The packet of interconnected shielding plates is arranged on a common base body, and the base body comprises fixing points for fixing to base bodies of other shielding modules of the same kind, which creates the possibility for connecting the shielding modules together without an additional supporting structure.

The fixing points on the base bodies are thus configured for connecting shielding modules together.

The particular advantage of the shielding module according to the invention is that no additional supporting structure is required for use. Shielding modules according to the invention may be joined together into self-supporting stable assemblies.

A further significant advantage of shielding modules according to the invention is that ready-mounted shielding modules may be joined together into a shield at the installation site of the furnace.

There is therefore no need for complex, error-susceptible mounting of individual shielding plates on site. Repair of a shield is also substantially facilitated since damaged shielding modules can simply be replaced.

Preferably, the base body is configured in the form of a box or a tray with a base plate and side walls, which side walls run substantially perpendicularly to a plane parallel to the shielding plates. The base plate is parallel to shielding plates.

This design of base body gives it a particularly high stiffness so that no undesirable deformation occurs when several base bodies are connected together.

At the same time, particularly favorably, fixing points may be formed on the side walls.

Preferably, four side walls are provided on a base body. The side walls may be created by bending the base plate or may be placed thereon.

Preferably, it is provided that the side walls point in a direction facing away from the shielding plates. In other words, the box formed by the base plate and side walls is open on the side facing away from the shielding plates (the "cold side").

Preferably, the shielding plates consist at least partially of a refractory metal or a refractory metal alloy. It may be provided that all shielding plates consist of a refractory metal or a refractory metal alloy. It may be provided that for example a shielding plate facing the process chamber, i.e. on the inside with respect to an installation position, is made of tungsten or a tungsten alloy, and the further shielding plates are made of molybdenum or a molybdenum alloy.

It is also possible that only some of the shielding plates are made of refractory metal, and for example one or more of the shielding plates on the cold side consists of a heat-resistant steel.

Refractory metals in the context of the present invention are metals of group 4 (titanium, zirconium and hafnium), group 5 (vanadium, niobium, tantalum) and group 6 (chromium, molybdenum, tungsten) of the periodic table, and rhenium. Refractory metal alloys are alloys with at least 50 at. % of the element concerned. These materials have, inter alia, excellent form stability at high usage temperatures. Tungsten and molybdenum and alloys thereof are particularly relevant for the present application.

Preferably, the base body is made of a heat-resistant alloy. Examples of such materials are—not exclusively—steels with material numbers 1.4301 (X5CrNi18-10), 1.4571 (X6CrNiMoTi17-12-2), 1.4841 (X15CrNiSi25-21) or also Ni-based alloys such as for example Inconel® 600. For very high usage temperatures, the base body may also be made of refractory metal or a refractory metal alloy. The base body can be favorably produced from sheets of said materials. A wall thickness (corresponding to a sheet thickness) of the base body is for example 3-5 mm. This wall thickness contributes to a high bending strength of the base body.

Dimensions of a typical shielding module may for example be: a length between 450 mm and 600 mm, a width between 150 mm and 450 mm, and a thickness between 80 mm and 100 mm. These figures are in no way restrictive. It has been found that shielding modules of these dimensions allow the formation of the relevant sizes and shapes of shields.

The base body has at least one side wall. Preferably, the base body has four side walls. Fixing points may be formed on one or more side walls. Preferably, it is provided that fixing points are formed on all side walls. In this way, it is possible to connect shielding modules to other shielding modules of the same kind on all sides.

The fixing points may be configured for example as bores or slots. Fixing means may be passed through bores or slots. Alternatively or additionally, the fixing points may be configured directly as fixing means: thus it is conceivable to form pins or similar on side walls which allow fixing to base bodies of other shielding modules, of the same kind.

Preferably, the shielding modules are rectangular in top view. The shielding modules may be quadratic.

Preferably, the shielding plates are substantially flat and hence the packet formed by the shielding modules is also substantially flat. However, deviations are possible. With curved shielding plates and a consequently curved packet of shielding plates, for example a shield composed of curved portions (viewed in cross-section) may be formed.

Flat embodiments are preferred for production reasons. The term “flat” here means substantially flat in comparison with curved. The shielding plates may indeed have a structuring, for example a rib structure or corrugated plate structure or a stud structure, to increase the inherent stiffness of the shielding plates.

It is preferably provided that at least one heat conductor mounting is formed on the shielding module. A heat conductor mounting allows the attachment of at least one heat conductor.

This describes the preferred refinement, according to which a heat conductor mounting is directly connected to the shielding module so that the heat conductor mounting and shielding module form an integral component.

The particular advantage of this is that, when several shielding modules are assembled into a shield of a high-temperature furnace, a heat conductor mounting need not be threaded in complex fashion through passage openings to be provided to this end. Rather, the heat conductor mounting is integrally connected to the shielding module. One or more heat conductor mountings may be provided on a shielding module.

The heat conductor mounting is connected to the shielding module at the base plate of the base body.

Particularly preferably, a guide sleeve is provided on the base plate for receiving the heat conductor mounting, via which the heat conductor mounting is supported over a greater length than merely over the thickness of the base plate. This preferred refinement guarantees a bend-resistant fixing of the heat conductor mounting on the base plate.

The refinement in which the heat conductor mounting is integrated in the shielding module substantially facilitates mounting of the shielding modules in comparison with previously known solutions, in which the heat conductor mountings are attached to a separate supporting structure. If the heat conductor mountings are attached to a separate supporting structure, the shielding modules must be positioned relative to the supporting structure in complex fashion during mounting, in order to thread the heat conductor mountings, which protrude from the supporting structure, into the shielding modules. Or—in equally complex fashion—bores which coincide with passage openings in the shielding modules must later be made in the supporting structure.

Preferably, it is provided that, at least along one side edge of the packet of shielding plates, a notch is formed which is suitable for engaging in a corresponding notch of a further shielding module. A notch means a step in the packet of shielding plates which results from a part of the shielding plates having a smaller lateral extent along a side edge of the packet than another part of the shielding plates. The notch or step causes an overlap of shielding plates of the connected shielding modules on connection of two shielding modules. This avoids the occurrence of a gap at the butt joint. This is important in particular when connecting shielding modules at an angle to one another.

Preferably, a shielding module has notches on two side edges. Particularly preferably, the notches on a shielding module are formed such that, on connection of shielding modules along said side edges, the notch of the one shielding module can engage in a notch of opposite design on the next shielding module.

Protection is also claimed for a shield for a high-temperature furnace comprising a plurality of interconnected shielding modules as claimed in at least one of the preceding claims.

If in addition heat conductors are attached to the shielding, this arrangement is known as a hot zone, for which protection is also claimed.

The shielding modules are interconnected via the above-mentioned fixing points and form a self-supporting structure. A shield or hot zone formed in this manner, when used in a high-temperature furnace, requires only local support points, since the interconnected shielding modules give the shield or hot zone sufficient inherent stiffness. Preferably, the shielding modules are connected into a circumferentially closed contour. In other words, the shield formed by a plurality of shielding modules forms a ring which is closed in a circumferential direction.

If the shielding modules are substantially flat, the contour has a polygonal form in cross-section.

If the shielding modules are curved, the contour may also be circular in cross-section.

Protection is also claimed for a high-temperature furnace with a plurality of shielding modules as claimed in at least one of the preceding claims, which delimit a process chamber of the high-temperature furnace, wherein directly adjacent shielding modules are connected together via the fixing points of their base bodies.

For clarification, in other words, the interconnected shielding modules with their sides facing one another form a space. This space is known as the process chamber of the high-temperature furnace.

Preferably, the process chamber has a theoretical polygonal cross-section. The arrangement of a plurality of shielding modules allows the formation of various cross-sectional shapes and diameters. It is particularly advantageous that shielding modules of the same kind may be used for different cross-sectional shapes and diameters. These shielding modules are connected together circumferentially via the fixing points of the base bodies.

In order to cover various lengths of process chambers, in addition further shielding modules may be added along a longitudinal extent of the process chamber via the fixing points of their base bodies.

Thus shielding modules of the same kind also allow the formation of process chambers of different lengths.

Preferably, it is provided that the interconnected base bodies of the multiplicity of shielding modules form a self-bearing supporting structure for the multiplicity of shielding modules.

Preferably, it is provided that on a side of one or more shielding modules facing the process chamber, a support is formed for a furnace shell.

Preferably, it is provided that the high-temperature furnace is configured for a horizontal feed. This means that a longitudinal axis of the high-temperature furnace runs substantially horizontally, in contrast to vertical furnaces in which the longitudinal axis runs vertically. Vertical furnaces are less complex than horizontal furnaces with respect to the support of the shielding, since almost no bending moments act on the shielding.

In a horizontal configuration, the advantages of the shielding modules according to the invention are particularly beneficial, since because of the self-supporting property of the interconnected shielding modules, there is no need for an additional supporting structure which would normally be essential for horizontal configurations.

BRIEF DESCRIPTION OF THE SEVERAL VIEWS OF THE DRAWING

The invention is explained in more detail with reference to the figures. The drawings show:

FIG. 13 details of shielding modules.

DETAILED DESCRIPTION OF THE INVENTION

Figure 1:
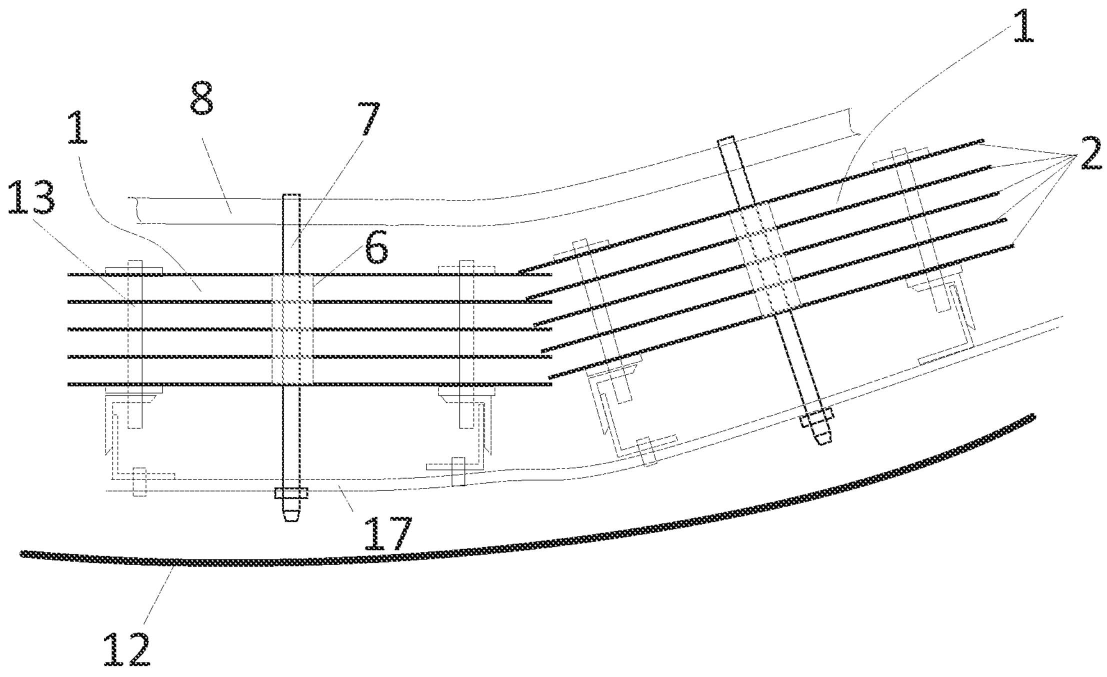
Fig. 1 (Prior Art)
FIG. 1 a shielding module according to the prior art.

FIG. 1 shows shielding modules 1 according to the prior art. An extract of an arrangement of shielding modules 1 is shown in cross-section, corresponding for example to an arrangement in a high-temperature furnace.

The shielding modules 1 consist of several mutually spaced shielding plates 2 which are held together by screws, pins or bolts 13. The shielding modules 1 are mounted on a supporting ring 17 and held in position by angle brackets, tabs or similar fixing means. The supporting ring 17 in turn is arranged inside a furnace shell 12 of a high-temperature furnace.

Furthermore, a heat conductor 8 is shown, which is mounted spaced from the shielding plates 2 by means of heat conductor mountings 7.

The disadvantage of shielding modules 1 according to the prior art is that, to support the shielding modules 1, a separately formed supporting structure must be provided, such as the supporting ring 17 in the present example.

The supporting structure must be adapted specifically for different dimensions or shapes of high-temperature furnaces, since the supporting structure follows a contour of the furnace shell in order to be evenly spaced from this.

A further disadvantage of shielding modules 1 according to the prior art is that the heat conductor mountings 7, which are mounted on the supporting ring 17, must be guided through corresponding passage openings 6 in the shielding plates 2. This makes installation of the shielding modules 1 more difficult.

Figure 2A:
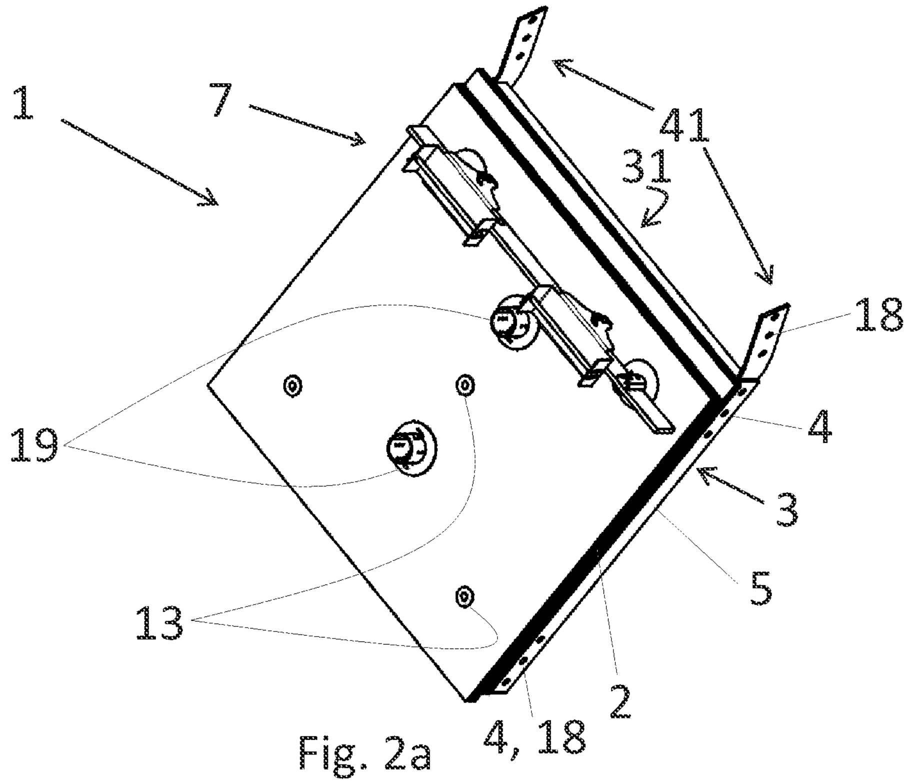
FIG. 2*a-c* a shielding module of the invention according to a first exemplary embodiment.
Figure 2B:
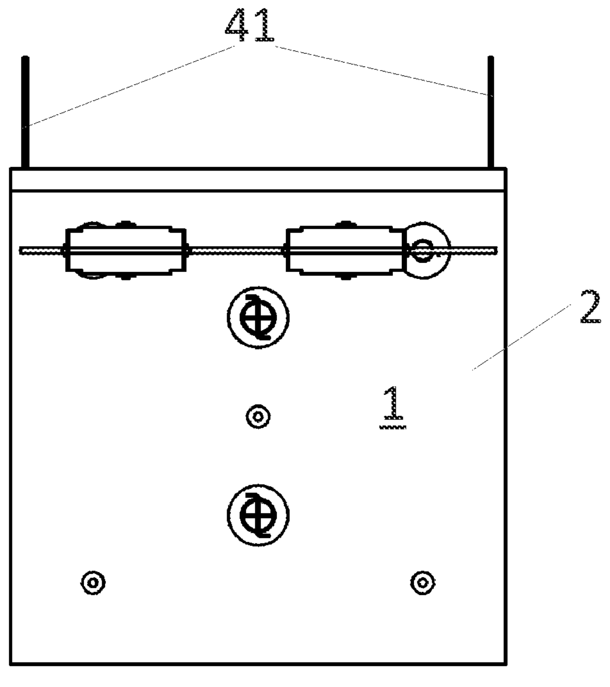
Figure 2C:
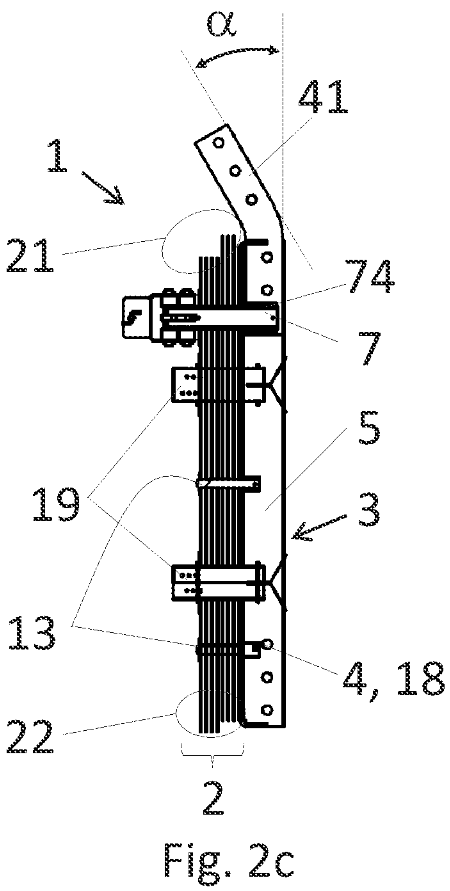

FIGS. 2*a* to 2*c* show a shielding module 1 according to the invention in a first exemplary embodiment.

In FIG. 2*a*, the shielding module 1 is shown in a perspective view. The viewing direction points to the side facing a process chamber in use, i.e. onto the shielding plates 2. The shielding module 1 comprises a plurality of shielding plates 2 which are arranged parallel to one another and connected together by bolts 13. The shielding plates 2 are spaced from one another by suitable spacing means. The shielding module 1 furthermore comprises a base body 3 on which the packet of shielding plates 2 is mounted. In this exemplary embodiment, the base body 3 is designed as a box and consists of a base plate 31 (not visible in this view), which substantially has the same dimensions as the shielding plates 2 and is parallel thereto, and side walls 5 which run perpendicularly to the base plate 31 and point to the side facing away from the shielding plates 2. The base body 3 is thus an open box, in this case with four side walls 5. The side walls 5 may be folded or flanged from the base plate 31 and/or placed thereon. For example, two of the side walls 5 may be folded and two others placed in position. The side walls 5 may also be welded on.

Gas passages 19 may also be present on the base plate 31.

Fixing points 4 in the form of bores 18 are provided on the side walls 5. Alternatively or additionally, fixing points 4 may be formed as slots. Base bodies 3 may be connected together via the fixing points 4, such as via rivets or screws.

In the present example, connecting webs 41 are already attached at two of the fixing points 4, by means of which a base body 3 can be connected to base bodies 3 of the same kind or at least largely similar base bodies 3.

The connecting webs 41 may be formed as simple metal strips with two legs standing at an angle $\alpha$ to one another. The angle $\alpha$ determines the later angular position of the base bodies 3 relative to one another. The connecting webs 41 are particularly suitable for connecting shielding modules 1 along a circumferential direction of a hot zone formed by a plurality of shielding modules 1. The shielding modules 1 may therefore be designed independently of the relative angular position to be set later. Thus advantageously, shielding modules 1 of the same kind may be used for different forms and diameters of shields.

The fixing points 1 in the form of bores 18 directly on the side walls 5 of the base body 3 are particularly suitable for connection of shielding modules 1 in a longitudinal direction of a hot zone formed by a plurality of shielding modules 1. Here, the connection takes place in one plane.

The shielding module 1 furthermore comprises heat conductor mountings 7 on which a heat conductor 8 can be attached. The heat conductor mountings 7 may be sleeves, bolts or comparable fixing means which are attached to the base plate of the base body 3. Thus the heat conductor mountings 7 are configured so as to be integral with the base body 3.

FIG. 2*b* shows a top view of the shielding module 1 looking onto the shielding plates 2. In this view, it is clear that the connecting webs 41 are slightly inwardly offset in parallel with respect to the assigned side walls 5, so that on connection of the base body 3 to a further base body 3, designed in the same kind, the connecting webs 41 can advantageously be brought to bear on its side walls 5 provided for connection.

FIG. 2*c* shows the shielding module 1 in a stepped section, so that a bolt 13 and a gas passage 19 can be seen in full.

The angle α, at which the connecting webs 41 run relative to the base plate of the base body 3, can be seen.

The heat conductor mounting 7 in this preferred example comprises a guide sleeve 74 which is welded or pressed onto the base plate 31 of the base body. The heat conductor mounting bolt 71 is introduced into the guide sleeve 74. A tube may also be used instead of a bolt. The guide sleeve 74 gives the heat conductor mounting bolt 71 support over a greater length than merely over the thickness of the base plate 31, which guarantees a bend-resistant fixing of the heat conductor mounting 7 to the base plate.

Also, notches 21, 22 in the packet of shielding plates 2 can be seen on the sides of the shielding module 1 which are intended for connection to shielding modules 1 of the same kind along a later circumferential direction of a shield formed by shielding modules 1. In the present example, this is the side of the shielding module 1 with the connecting webs 41, and the opposite side. The notches 21, 22 are configured in opposite design, so that when two shielding modules 1 are connected, the notches 21, 22 engage in one another and create an overlap of shielding plates 2.

Preferably, a shielding module 1 has notches on two opposite sides, while the two remaining sides are free from notches. The sides with notches are provided for angled connection of shielding modules 1, as occurs along a circumferential direction of a shield. The sides without notches are particularly suitable for a flat connection of shielding modules 1, as occurs along a longitudinal direction of the shield.

Figure 3A:
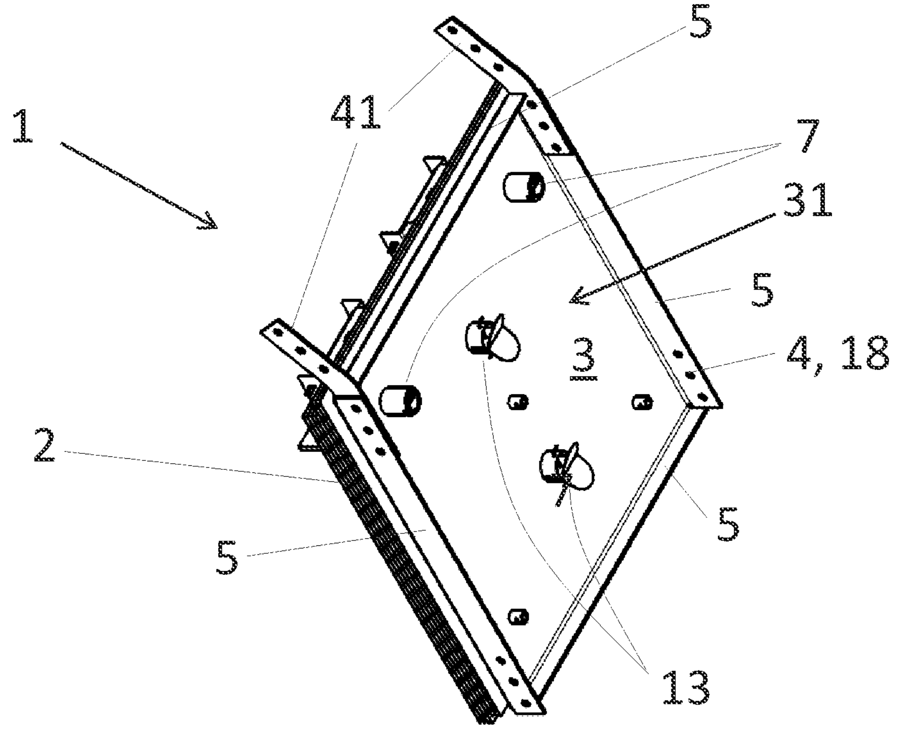
FIG. 3*a-c* a shielding module of the invention in further views.
Figure 3B:
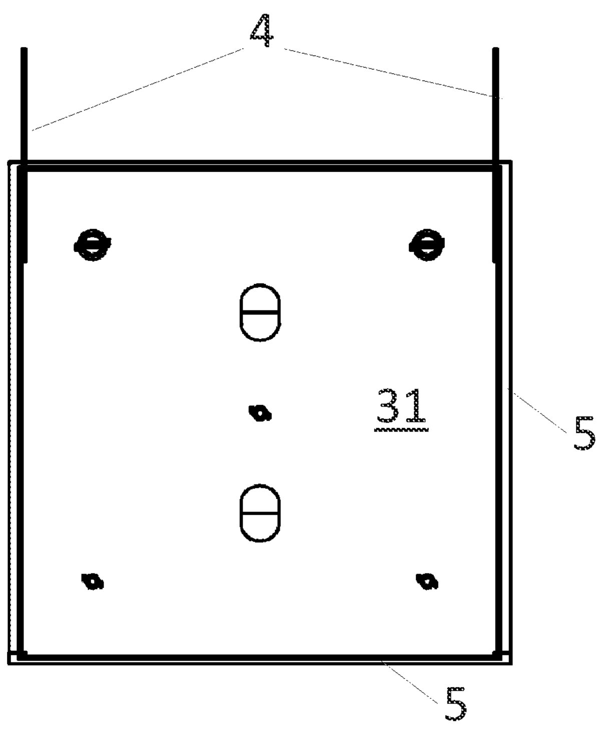
Figure 3C:
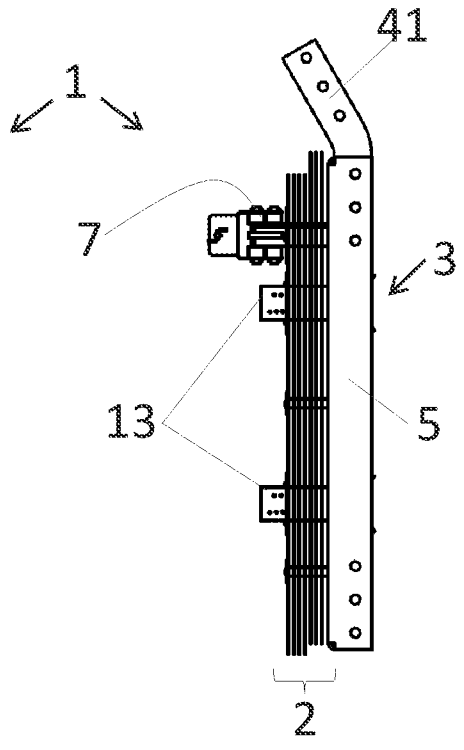

FIGS. 3*a* to 3*c* show alternative views of the shielding module 1 of the same exemplary embodiment as FIGS. 2*a*-2*c*.

FIG. 3*a* shows the shielding module 1 in a perspective view. The observer is looking onto the rear side of the shielding module 1, i.e. the ("cold") side facing away from a process chamber in the later installation position. The base plate 31 of the base body 3 can be seen, and also the side walls 5 standing perpendicularly thereto. The heat conductor mountings 7, and bolts 13 at which the shielding plates 2 are arranged and attached, are also evident.

FIG. 3*b* shows a top view of the shielding module 1 looking onto the base plate 31.

FIG. 3*c* shows the shielding module 1 in a side view. With respect to reference signs, the statements relating to FIGS. 2*a*-2*c* also apply here.

FIGS. 4*a* to 4*d* show details of shielding modules 1.

Figure 4A:
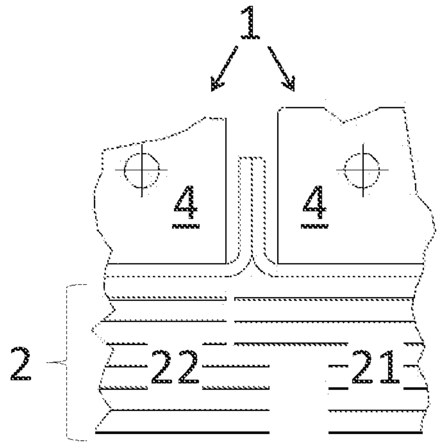
FIG. 4*a*-4*d* details of shielding modules.

FIG. 4*a* shows in extract two shielding modules 1 which are arranged abutting and parallel to one another. It is advantageous if the shielding plates 2, as shown here, are provided with notches 21, 22 so that, on butt-jointing of two shielding modules 1, the shielding plates 2 at least partially overlap. This prevents the direct escape of radiation as would occur in the case of a pure butt joint.

In the arrangement shown here, the shielding modules 1 lie in one plane. Particularly advantageously, notches 21, 22 are provided for angled connections of shielding modules 1, as shown below.

Figure 4B:
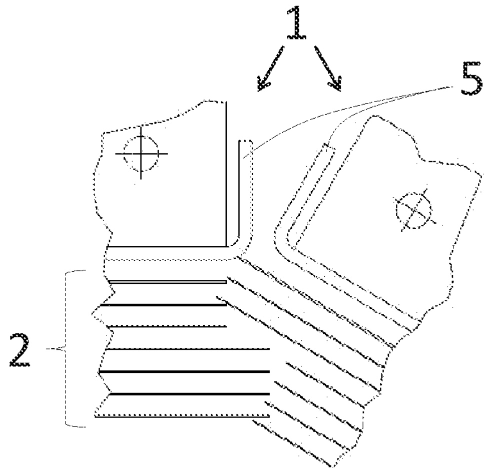

FIG. 4*b* shows an arrangement of two shielding modules 1 in which the shielding modules 1 are tilted relative to one another. This arrangement occurs for example if shielding modules 1 are connected together in order to form a closed ring along a circumferential direction of a high-temperature furnace.

Figure 4C:
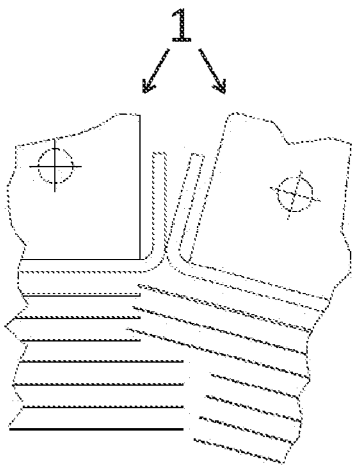

FIG. 4*c* shows a similar configuration to FIG. 4*b*, but with a smaller tilt of the shielding modules 1 relative to one another. A sealing cord (not shown) or similar may be placed in the angled gap between the side walls 5 of adjacent shielding modules 1 which results from the tilting of the shielding modules 1.

Figure 4D:
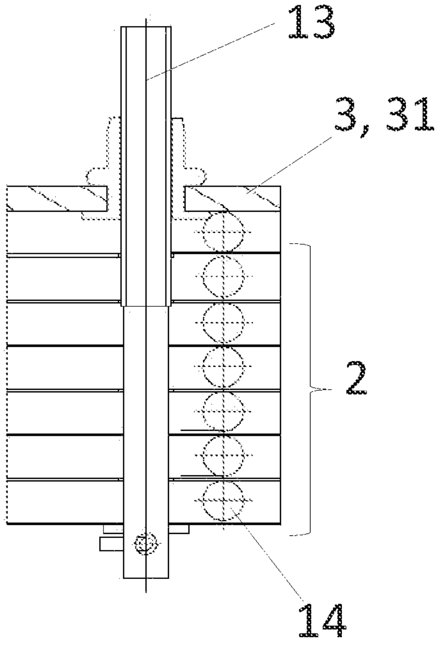

FIG. 4*d* shows a detail of the structural design of the fixing of the shielding plates 2 to the base plate 31 of the base body 3. The shielding plates 2 are mounted via bolts 13 and spaced apart from one another via spacing means 14. The bolt 13 is suitably secured to the base plate 31, e.g. via a locking.

Figure 5:
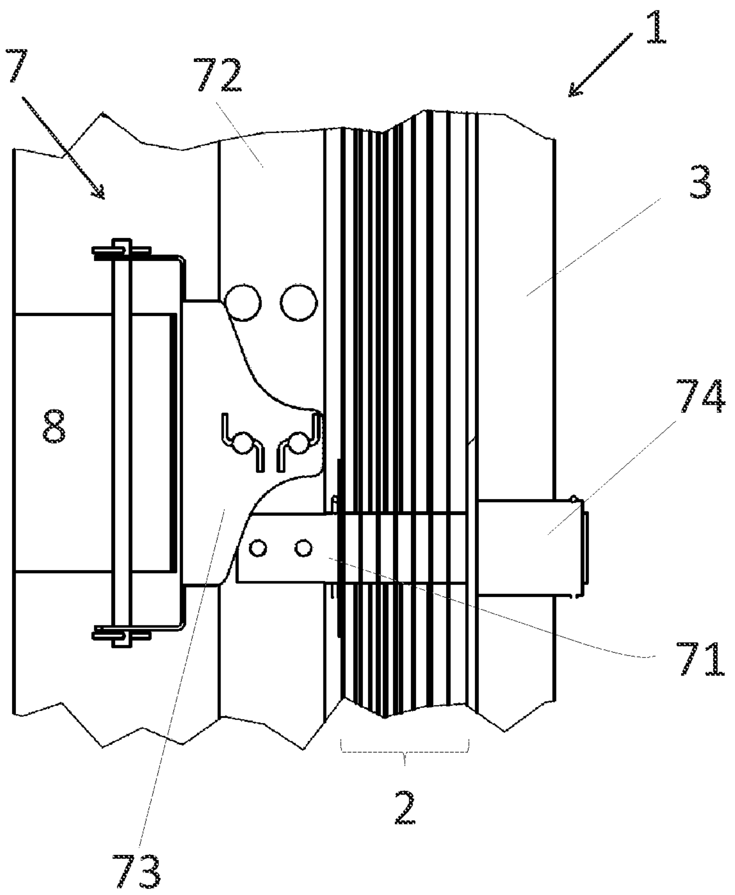
FIG. 5 a heat conductor mounting according to one exemplary embodiment in detail.

FIG. 5 shows in detail a heat conductor mounting 7 according to one exemplary embodiment.

The heat conductor mounting 7 is an assembly of several components.

In this exemplary embodiment, the heat conductor mounting 7 comprises a heat conductor mounting bolt 71, a connecting rail 72 and a heating bracket 73 in which a heat conductor 8 may be inserted.

The heat conductor mounting bolt 71 is attached to the base body 3 via a guide sleeve 74 integral therewith. The heat conductor mounting bolts 71 protrude through corresponding openings through the shielding plate 2.

A connecting rail 72, on which the heating brackets 73 may be attached, is formed between the heat conductor mounting bolts 71. The connecting rail 72 runs substantially perpendicularly to a main extent direction of the heat conductor 8.

The retention of the heat conductor 8 via the heating bracket 73 allows a movement of the heat conductor 8 because of thermal expansion.

A heat conductor mounting 7 may in principle also be configured more simply, but the construction shown here particularly advantageously supports a modular structure of hot zones by joining together shielding modules 1 of the same kind.

If the heat conductor mounting 7 is formed as an integral part of the shielding module 1, as preferred and shown here, later mounting of the heat conductor 8 is particularly simple. The provision of a connecting rail 72 allows free positioning of the heating brackets 73 along the connecting rail 72, whereas without the connecting rail 72, the position of the heating brackets 73 would be predefined by the position of the heat conductor mounting bolts 71. This additional degree of freedom in the positioning of the heating brackets 73 is particularly useful for setting homogenous heating conditions in the high-temperature furnace.

Figure 6:
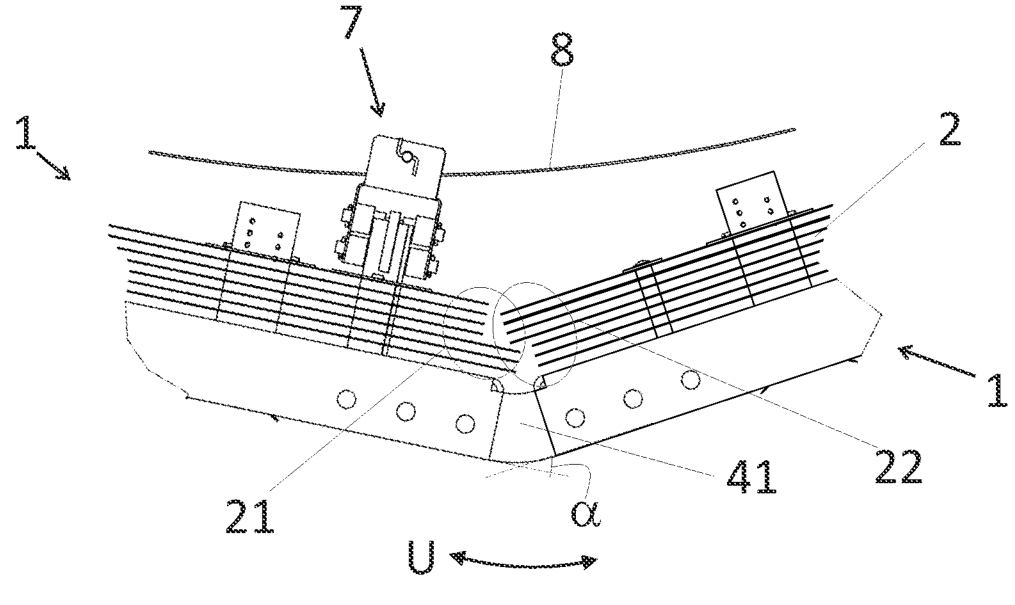
FIG. 6 an arrangement of two shielding modules.

FIG. 6 shows an arrangement of two shielding modules 1 which are connected together at an angle α in a circumferential direction U. The view corresponds to an end-face observation of a hot zone or a shield, formed from several shielding modules 1 of the same kind.

By varying the angle of the shielding modules 1 relative to one another, different cross-sectional contours and sizes of hot zones can be implemented with a plurality of shielding modules 1.

It is here particularly advantageous that shielding modules 1 of the same kind may be used for different sizes and/or cross-sectional contours of hot zones. This modular structure allows variants of hot zones to be produced particularly economically.

The notches 21, 22 on the packet of shielding plates 2 are such that part of the shielding plates 2 of a shielding module 1 protrudes into the gap formed by the notch in the packet of shielding plates 2 of the adjacent shielding module 1. For this, a shielding module 1 has notches 21, 22 on two side edges. Preferably, the notches on a shielding module are formed such that, on connection of shielding modules 1 along said side edges, the notch 21 of the one shielding module can engage in the oppositely designed notch 22 of the next shielding module 1, as shown in the present figure.

The notch 21, 22 may preferably be dimensioned such that the shielding plates 2 do not touch in cold state, but when reaching operating temperature, because of thermal expansion, the gap is reduced or the shielding plates 2 overlap.

Figure 7:
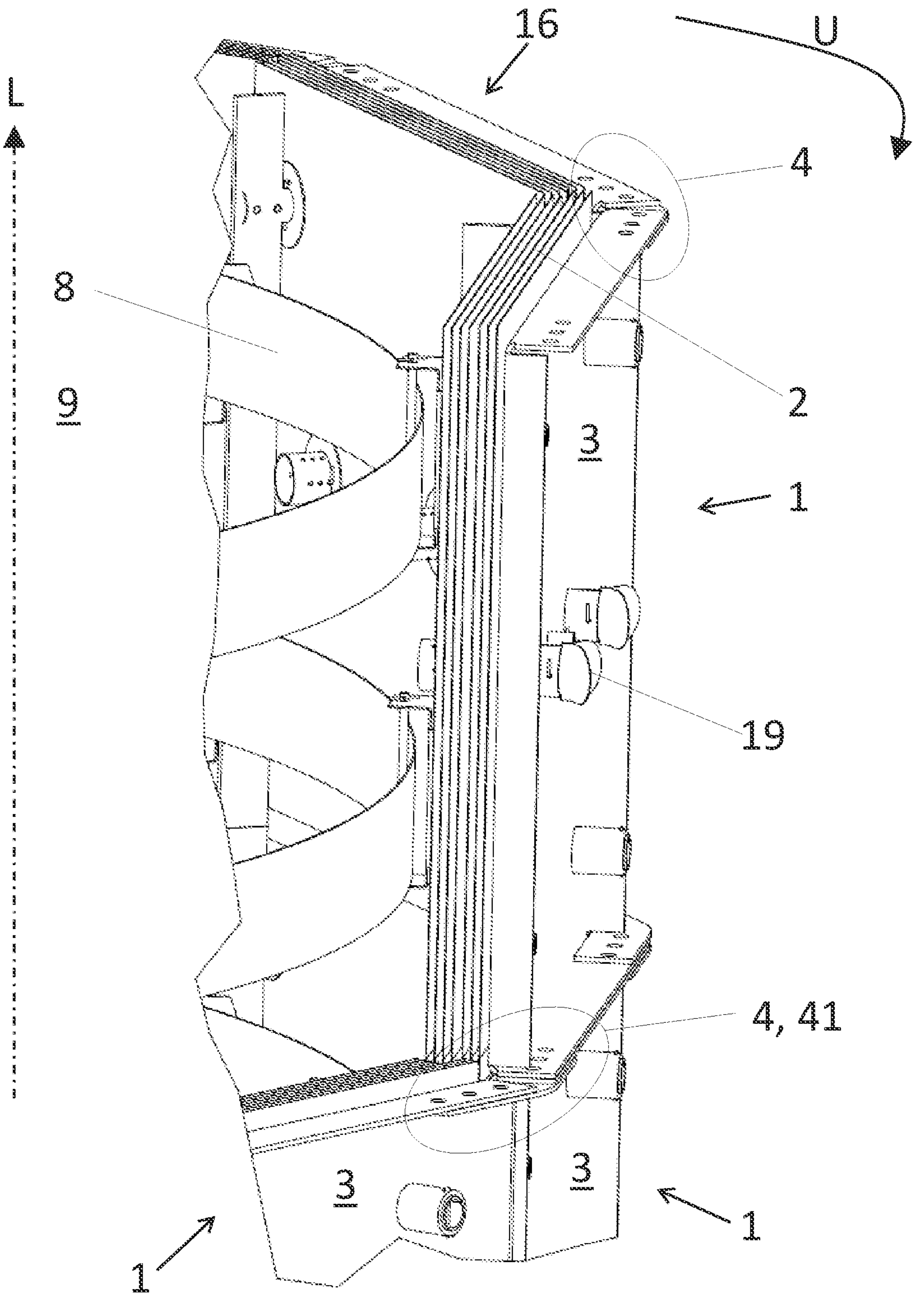
FIG. 7 an extract of an arrangement of shielding modules in an assembly.

FIG. 7 shows an extract of an arrangement of shielding modules 1 in an assembly into a hot zone 16. For greater clarity of the details, a shielding module 1 has not been shown with respect to a real arrangement. An assembly of shielding modules 1 without heat conductors 8 is also known as a shield. If heat conductors 8 are additionally attached to the insulating zone, this arrangement is known as a hot zone 16.

An assembly of four shielding modules 1 can be seen. The shielding modules 1 are connected together via fixing points 4. It is evident that shielding modules 1 are connected both in a longitudinal direction L of the hot zone 16 in order to form its longitudinal extent, and in a circumferential direction U in order to set a desired diameter of the hot zone 16.

It is particularly advantageous that no additional supporting structure is required because of the shielding modules 1 according to the invention with fixing points 4 at the base bodies 3. Rather, the connection of the shielding modules 1 creates a self-supporting structure.

In the circumferential direction U, the shielding modules 1 are connected together via connecting webs 41 described above. The shielding modules 1 are configured and positioned relative to one another in assembly such that the above-described notches engage in one another in the circumferential direction U. This may prevent a heat loss by radiation during operation.

In the longitudinal direction L, the shielding modules 1 are connected together along the sides which have no notches. Advantageously, the shielding plates 2 are push-fitted together at these butt joints in order to create a connection which is sealed against radiation. The shielding plates 2 for this protrude beyond the side walls 5.

It is particularly advantageous that ready-mounted shielding modules 1 may be used for the assembly of the hot zone 16. There is no need for complex assembly of individual shielding plates 2 at the installation site of the hot zone 16. Repair is also made substantially easier: faulty shielding modules 1 can simply be replaced.

It is particularly advantageous that there is also modularity in the depth/length direction, i.e. for example, a shielding module 1 at the front may be replaced without having to remove the entire packet of shielding modules 1 in the entire length direction.

Because of the absence of an additional supporting structure, the shielding modules 1 are accessible on their cold side, i.e. the side facing away from the process chamber 9.

Figure 8:
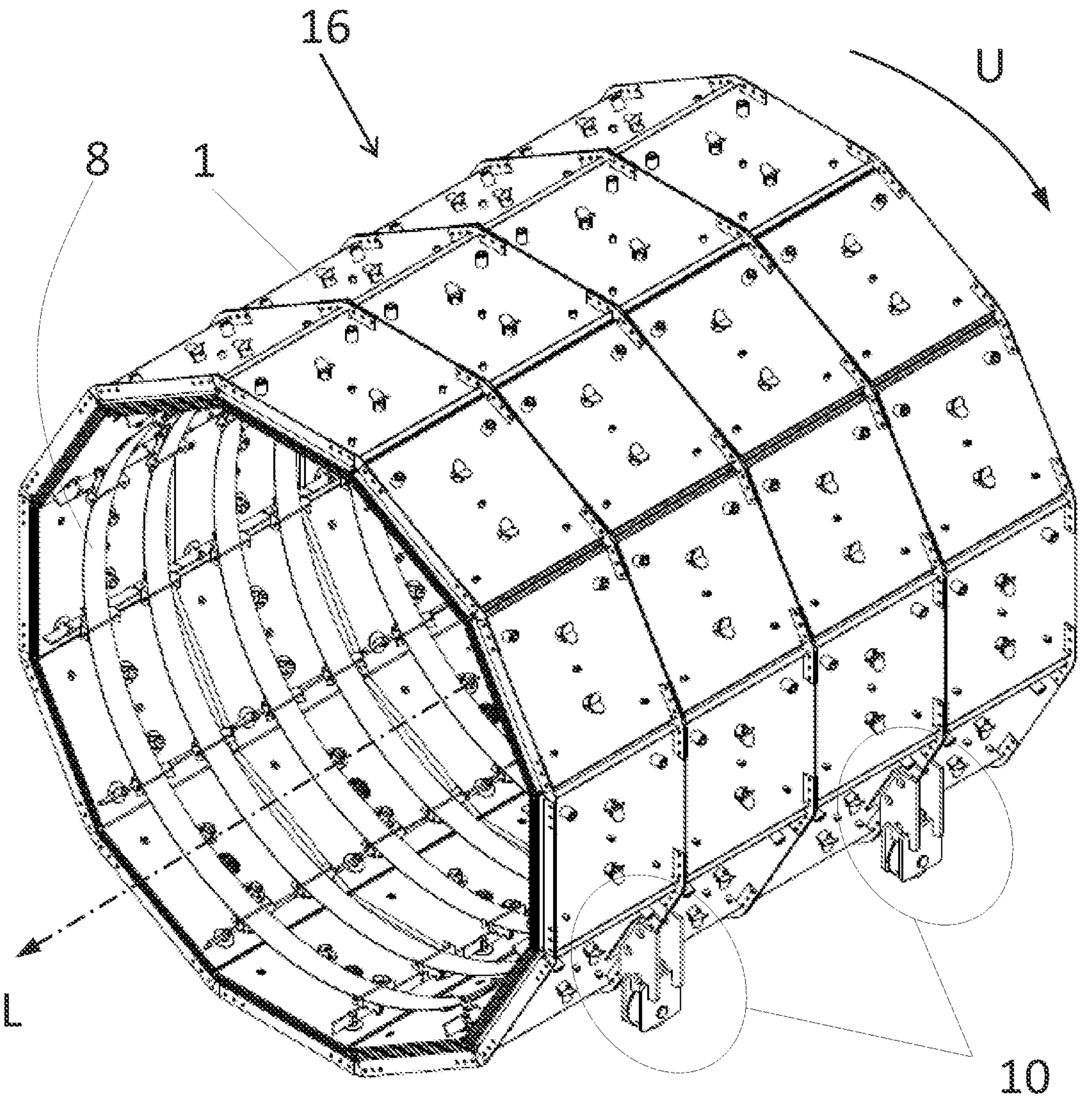
FIG. 8 a hot zone.

FIG. 8 shows a perspective view of a hot zone 16 in an assembly. The hot zone 16 in the present example comprises (12×4=48) shielding modules 1. In the exemplary assembly, shielding modules 1 are connected together in a longitudinal direction L and in a circumferential direction U of the hot zone 16. In the circumferential direction U, twelve shielding modules 1 in each case are connected into a ring with the cross-section of a regular dodecagon. In the longitudinal direction L, four of the rings are connected to form the total length of the hot zone 16.

By use of the shielding modules 1 according to the invention, a very rigid self-supporting structure is obtained which allows merely local support points.

In the present example, the hot zone 16 may be supported by four supports 10 (two of which are not visible). The supports 10 are here configured as roller bearings and therefore allow unhindered thermal expansion of the hot zone 16. Also, because of this advantageous mounting, the hot zone 16 can easily be installed in and removed from a furnace shell of a high-temperature furnace.

The supports 10 may be placed on rails on the inside of a furnace shell of a high-temperature furnace (not shown here).

Figure 9:
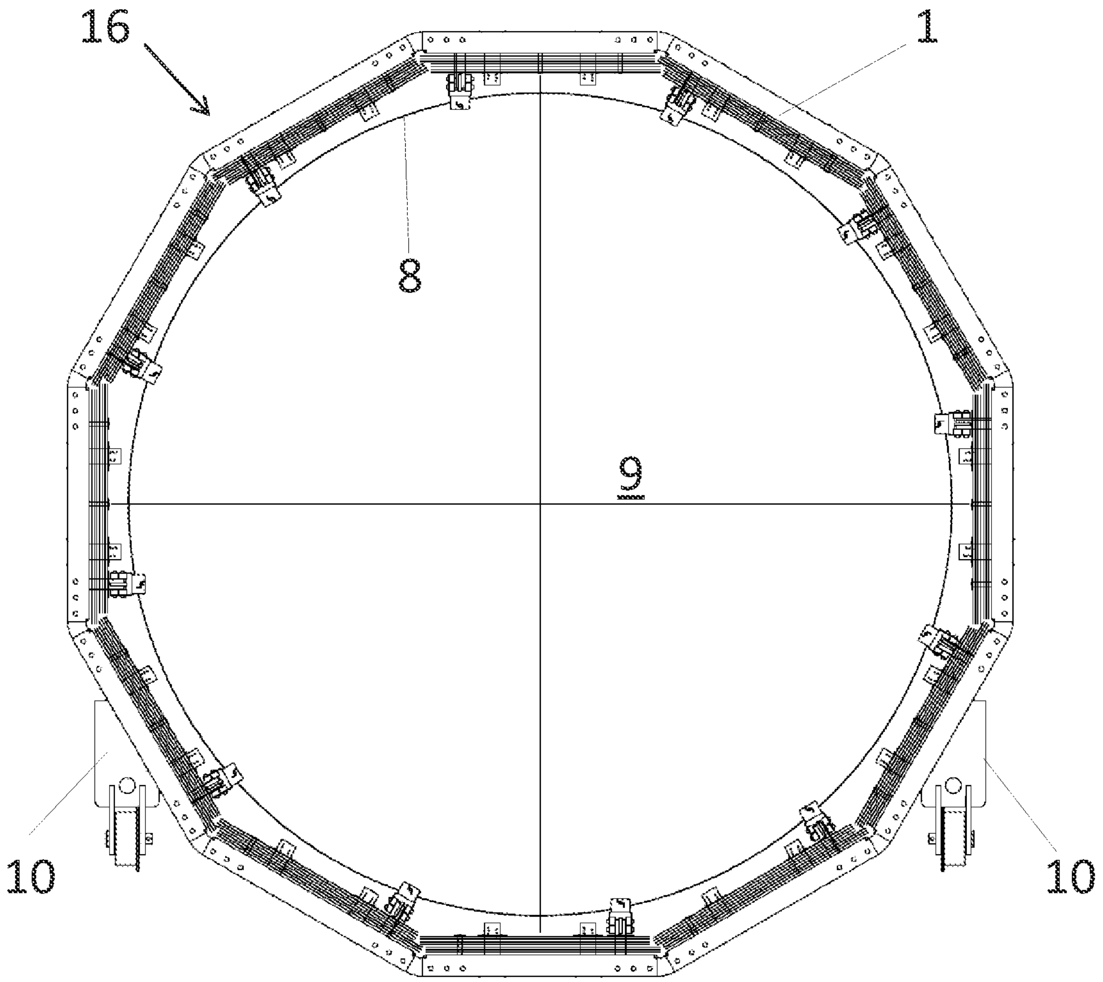
FIG. 9 a front view of the hot zone from FIG. 8.

FIG. 9 shows a front view of the hot zone 16 from FIG. 8. The shielding modules 1 delimit a process chamber 9. The process chamber 9 forms the space provided for heat treatment.

Figure 10:
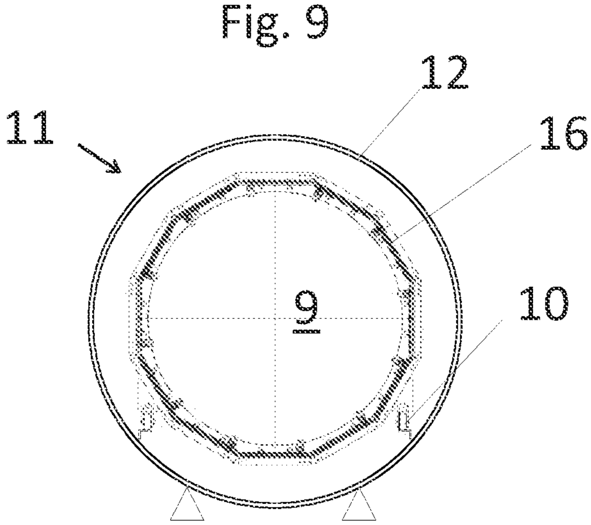
FIG. 10 a front view of a horizontal high-temperature furnace.

FIG. 10 shows a front view of a high-temperature furnace 11 with installed hot zone 16. The high-temperature furnace 11 comprises a furnace shell 12 which is usually configured as a double-walled and cooled steel shell. On the inside of the furnace shell 12, the hot zone 16 rests on rails provided for this.

The high-temperature furnace 11 is configured as a horizontal furnace, i.e. the longitudinal direction of high-temperature furnace 11 and accordingly of the hot zone 16 runs horizontally.

The invention is particularly advantageous for horizontal furnaces, since here the favorable property of the self-supporting structure is particularly beneficial.

When arranged horizontally, conventional shielding modules would have to be suspended from a separate supporting structure.

Figure 11:
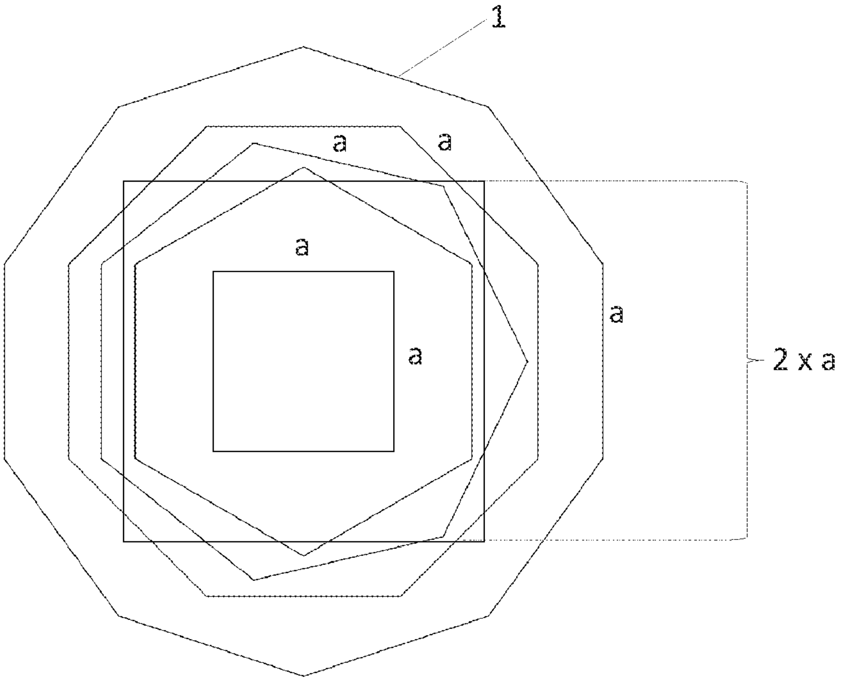
FIG. 11 possible variations in the design of hot zones.

FIG. 11 shows schematically a selection of possible variations in the form of hot zones which may be produced by connecting shielding modules 1 of the same kind with an edge length a.

The modular structure allows the implementation of widely varying diameters and contours of hot zones with shielding modules 1 of the same kind.

In this example, by use of flat shielding modules 1, polygonal forms are produced.

Figure 12:
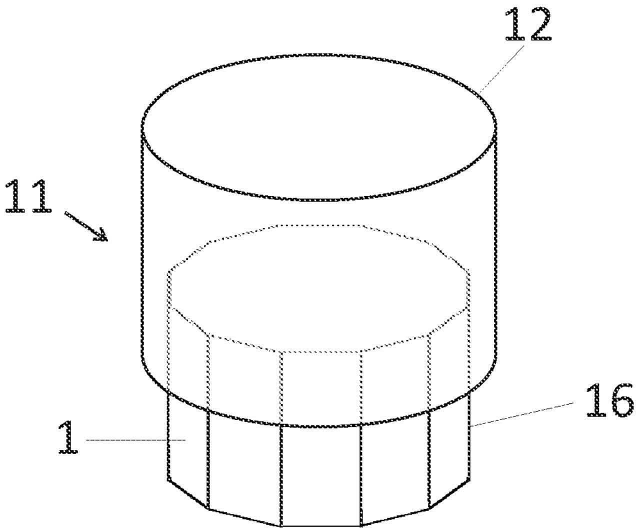
FIG. 12 a high-temperature furnace in vertical design.

FIG. 12 shows schematically a high-temperature furnace 11 with a furnace shell 12 and a vertically arranged hot zone 16 comprising shielding modules 1 which, in this example, are arranged to form a cross-section of a regular dodecagon.

FIG. 13*a* shows a perspective view of a rectangular shielding module 1 of an exemplary embodiment. It is evident that notches 21, 22 are formed on the long sides of the shielding module 1. Preferably, the long sides of the shielding module 1 are used for angled connection of shielding modules 1 in a circumferential direction. The narrow sides of the rectangular shielding module 1 have no notches, and are preferably provided for a flat connection of shielding modules 1.

FIGS. 13*b* and 13*c* show side views of the shielding module 1. FIG. 13*b* shows a side view of a long side of the shielding module 1. FIG. 13*c* shows a side view of a narrow side of the shielding module 1.

FIG. 13*d* shows variants of connecting webs 41 which may serve as connecting pieces for implementing different angles between shielding modules 1.

LIST OF REFERENCE SIGNS

1 Shielding module
2 Shielding plate

21, 22 Notch
3 Base body
31 Base plate
4 Fixing point
41 Connecting web
5 Side wall
6 Passage opening
7 Heat conductor mounting
71 Heat conductor mounting bolt
72 Connecting rail
73 Heating bracket
74 Guide sleeve
8 Heat conductor
9 Process chamber
10 Support
11 High-temperature furnace
12 Furnace shell
13 Bolt/pin
14 Spacing means
15 Shield
16 Hot zone
17 Supporting ring
18 Bore
19 Gas passage
L Longitudinal direction
U Circumferential direction
a Edge length

The invention claimed is:

1. A shielding module for a high-temperature furnace, the shielding module comprising:

a common base body; and a packet of interconnected shielding plates mounted on said common base body;

said common base body having fixing points for fixing to base bodies of other shielding modules of the same kind.

2. The shielding module according to claim 1, wherein said base body is a box with a base plate and side walls, and wherein said side walls run substantially perpendicularly to a plane parallel to said shielding plates.

3. The shielding module according to claim 1, wherein said base body has four side walls.

4. The shielding module according to claim 1, wherein said fixing points are arranged on at least one side wall of said base body.

5. The shielding module according to claim 1, further comprising at least one heat conductor mounting formed on the shielding module and connected to said base body.

6. The shielding module according to claim 5, further comprising a guide sleeve connected to said base plate and connecting said heat conductor mounting to said base body.

7. The shielding module according to claim 1, wherein said packet of shielding plates has at least one side edge formed with a notch configured for engaging in a corresponding notch of a further shielding module.

8. The shielding module according to claim 1, wherein said shielding plates consist of a refractory metal.

9. A shield for a high-temperature furnace, the shield comprising a plurality of shielding modules each according to claim 1.

10. A hot zone, comprising a plurality of shielding modules each according to claim 1, at least one heat conductor mounting, and at least one heat conductor.

11. A high-temperature furnace, comprising:

a plurality of shielding modules each according to claim 1, said shielding modules delimiting a process chamber of the high-temperature furnace;

wherein directly adjacent shielding modules are connected to one another via the fixing points of the base bodies.

12. The high-temperature furnace according to claim 11, wherein the process chamber has a theoretical polygonal cross-section.

13. The high-temperature furnace according to claim 11, wherein a plurality of interconnected base bodies of said plurality of shielding modules form a self-bearing supporting structure.

14. The high-temperature furnace according to claim 11, further comprising at least one support for mounting a shield of a plurality of said shielding modules disposed on a side of one or more of said shielding modules facing the process chamber.

15. The high-temperature furnace according to claim 11, wherein the high-temperature furnace is configured for a horizontal feed.

* * * * *